US008348227B2

(12) United States Patent
Zoller

(10) Patent No.: US 8,348,227 B2
(45) Date of Patent: Jan. 8, 2013

(54) FLOW-VOLUME REGULATOR

(75) Inventor: Uwe Zoller, Auggen (DE)

(73) Assignee: Neoperl GmbH, Muellheim (DE)

( * ) Notice: Subject to any disclaimer, the term of this patent is extended or adjusted under 35 U.S.C. 154(b) by 673 days.

(21) Appl. No.: 12/518,064

(22) PCT Filed: Nov. 22, 2007

(86) PCT No.: PCT/EP2007/010105
§ 371 (c)(1),
(2), (4) Date: Jun. 5, 2009

(87) PCT Pub. No.: WO2008/067912
PCT Pub. Date: Jun. 12, 2008

(65) Prior Publication Data
US 2011/0017322 A1    Jan. 27, 2011

(30) Foreign Application Priority Data
Dec. 6, 2006   (DE) .......................... 10 2006 057 787

(51) Int. Cl.
F16K 47/00   (2006.01)
(52) U.S. Cl. ............ 251/120; 137/504; 138/43; 138/45; 138/46
(58) Field of Classification Search ................... 251/118, 251/120; 137/504; 138/43, 45, 46; 239/410, 239/412, 416.5
See application file for complete search history.

(56) References Cited

U.S. PATENT DOCUMENTS

| | | | | |
|---|---|---|---|---|
| 2,960,109 A | * | 11/1960 | Wilson | 137/517 |
| 3,216,451 A | * | 11/1965 | Smallpeice | 137/861 |
| 4,562,960 A | * | 1/1986 | Marty et al. | 239/72 |
| 4,867,198 A | | 9/1989 | Faust | |
| 5,340,080 A | * | 8/1994 | Cleland | 251/120 |
| 5,743,291 A | * | 4/1998 | Nehm et al. | 137/454.2 |

(Continued)

FOREIGN PATENT DOCUMENTS

DE   87 03 945 U   5/1987

(Continued)

OTHER PUBLICATIONS

International Search Report (PCT/EP2007/010105) and translation thereof (4 pages).
English translation of International Preliminary Report on Patentability (six (6) pages).

Primary Examiner — John K Fristoe, Jr.
Assistant Examiner — Jessica Cahill
(74) Attorney, Agent, or Firm — Crowell & Moring LLP

(57) ABSTRACT

A fluid flow regulator includes a regulating profile which is either centrally or peripherally disposed within the flow rate regulator, and an annular restrictor which is made of an elastic material. In a functional position of the flow rate regulator, the restrictor delimits a control gap between itself and the regulating profile. In a starting position of the flow rate regulator, the flow rate regulator has an unrestricted flow cross section that is larger than the control gap. The unrestricted flow cross section of the flow rate regulator is variable by a deformation of the restrictor in response to a pressure differential that is generated when a fluid flows through the flow rate regulator. The relative position of the restrictor and the regulatory profile is variable, and moveable against a reset force, into the functional position from the starting position, in response to a flow of fluid within the flow rate regulator. The reset force may be provided in the form of a spring.

19 Claims, 9 Drawing Sheets

U.S. PATENT DOCUMENTS

| | | | |
|---|---|---|---|
| 6,129,112 A * | 10/2000 | Huthmann et al. | 137/517 |
| 6,311,712 B1 * | 11/2001 | Meyer | 137/8 |
| 6,789,567 B2 * | 9/2004 | Meyer | 137/517 |
| 6,902,123 B2 * | 6/2005 | Grether et al. | 239/428.5 |
| 7,594,519 B2 * | 9/2009 | Hart et al. | 138/43 |
| 7,871,023 B2 * | 1/2011 | Grether | 239/600 |
| 2003/0209278 A1 * | 11/2003 | Sochtig | 138/43 |
| 2004/0079418 A1 * | 4/2004 | Weis et al. | 137/542 |

FOREIGN PATENT DOCUMENTS

| | | | |
|---|---|---|---|
| EP | 1 600 839 A2 | | 5/2005 |
| WO | WO2006/079505 | * | 8/2006 |
| WO | WO2006/094581 | * | 9/2006 |

* cited by examiner

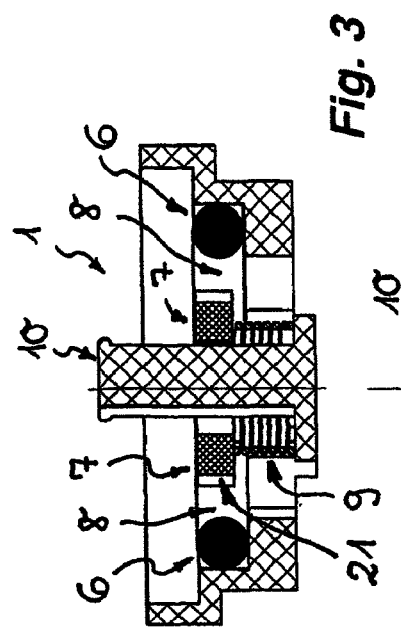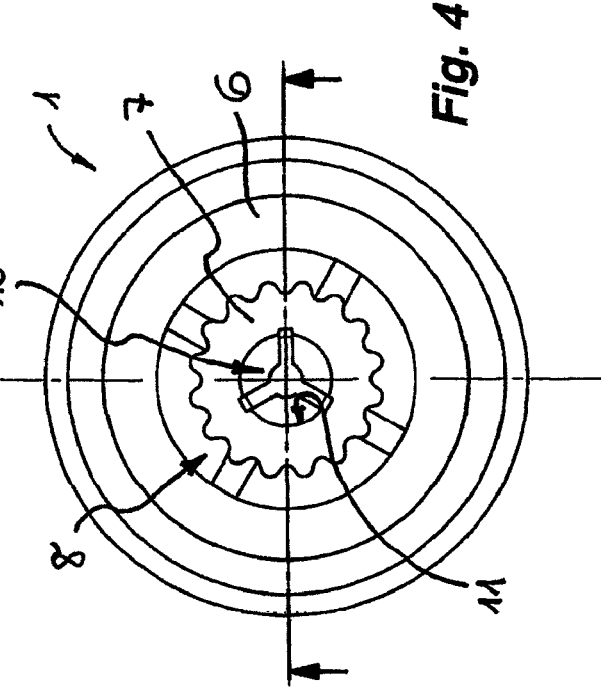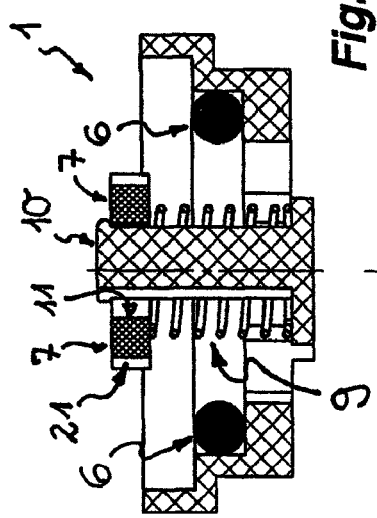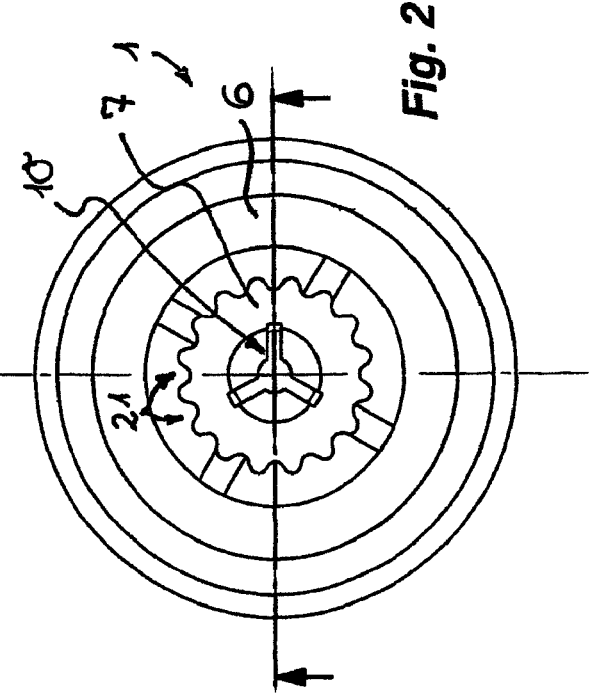

FLOW-VOLUME REGULATOR

This application is a national stage of PCT International Application No. PCT/EP2007/010105, filed Nov. 22, 2007, which claims priority under 35 U.S.C. §119 to German Patent Application No. 10 2006 057 787.6, filed Dec. 6, 2007, the entire disclosure of which is herein expressly incorporated by reference.

The invention relates to a flow rate regulator with an annular restrictor that is made of an elastic material and delimits a control gap between itself and an internal and/or external lying regulating profile in a functional position. The unrestricted flow cross section of the control gap is variable by the restrictor, which deforms under the pressure differential that is generated when the fluid flows through.

BACKGROUND OF THE INVENTION

Flow rate regulators already exist in a variety of designs. With the aid of such flow rate regulators the maximum flow rate of a fluid per unit of time is supposed to be equalized independently of the potential pressure fluctuations and is supposed to be set at a defined value. Insofar as the fluid concerns, for example, drinking water conveyed in a drinking water line, a jet regulator may also be mounted downstream of such a flow rate regulator on the water spout of a plumbing outlet fixture. The jet regulator is supposed to produce a homogeneous, non-splashing and optionally also sparkling soft water jet. Since, however, the pressure losses caused, on the one hand, by the flow rate regulator and, on the other hand, by the downstream jet regulator, may add up in such a way that the downstream jet regulator does not have an adequate amount of water, the upstream flow rate regulator can also have a negative impact on the function of the downstream jet regulator—especially in the case of low pressure conditions. Therefore, in such areas, where, as a rule, only low water pressure prevails, a flow rate regulator can have such a negative impact on the available volume of water, that it is not practical to install such flow rate regulators in such areas. This drawback may be further intensified, if so-called booster pumps are used in order to increase the water pressure. These booster pumps result in a high pressure that increases even more the prevailing pressure differentials and appears to suggest all the more the installation of an equalizing flow rate regulator.

The applicant's German patent document DE 10 2005 011 947 A, which was filed before the present patent application, but was not published until after the present patent application, describes a flow rate regulator which allows a change in the maximum rate of flow. The previously described flow rate regulator exhibits in its control housing a passage channel, in which there are two regulating devices, which are arranged one behind the other in an elongation of the passage channel, comprise an annular restrictor and a central regulating core, and are designed for different flow rates or different pressure ranges. In this context the regulating device, which is designed for the lower flow rate and/or the lower pressure range, has at least one bypass channel or a similar passage opening, which can be opened and closed, and is opened for a higher flow rate and/or a higher pressure range and closed for the lower flow rate and/or the lower pressure range. Therefore, this flow rate regulator, described in the earlier publication, has two regulating devices, which are designed for different flow rates and/or different pressure ranges. For the lower flow rate and/or the lower pressure range the at least one passage opening is closed to the regulating device, designed for the lower flow rate and/or the lower pressure range, so that the flow medium—for example, water—must pass both the flow path between the regulating core and the restrictor for the higher flow rate and/or the higher pressure range and also the flow path between the regulating core and the restrictor of the regulating device for the lower flow rate and/or the lower pressure range. At the same time the characteristics of the flow rate regulator, described in the earlier publication, are set by the regulating device, designed for the lower flow rate and/or the lower pressure range.

For the higher flow rate and/or the higher pressure range, the at least one passage opening is opened to the regulating device for the lower flow rate and/or the lower pressure range, so that the flow medium—for example, water—can pass only the flow path between the regulating core and the restrictor of the regulating device for the higher flow rate and/or the higher pressure range, but not the flow path between the regulating core and the restrictor of the regulating device for the lower flow rate and/or the lower pressure range. Rather, it bypasses the regulating device for the lower flow rate and/or the lower pressure range through the passage opening. In this case the characteristics of the flow rate regulator, described in the earlier publication, are defined only by the regulating device for the higher flow rate and/or the higher pressure range. Thus, the maximum flow rate and/or the anticipated pressure range can be changed easily and quickly by opening or closing the passage opening, provided in German patent document DE 10 2005 011 947 A.

The characteristics can be changed with the flow rate regulator in German patent document DE 10 2005 011 947 A, but even the use of this flow rate regulator is less advantageous in areas where temporally and/or locally extreme pressure differentials and pressure fluctuations prevail.

Applicant's German patent document DE 20 2004 008 281 U1 discloses an additional flow rate regulator of the genre described in the introductory part. In order to be able to consider in the case of a flow rate regulator, which is inserted in the water inlet of an instantaneous water heater, the seasonally dependent temperature differentials; to guarantee a higher water flow rate, for example, in the summer when the inflowing tap water is usually already warmer than in the winter; to adjust the outflowing water to the same temperature; and to be able to change additionally the maximum flow rate with a low degree of sophistication, the flow rate regulator, which is disclosed in German patent document DE 20 2004 008 281 U1 of the prior art, exhibits an inner section of the housing that can be moved in relation to the restrictor in the regulator housing. The inner section of the housing can be operated by way of a control element, which protrudes outwards on the outer periphery of the inner section of the housing. The inner section of the housing on both sides of its control element is tightly encompassed by an outer section of the housing. The outer sections are arranged so as to be stationary in relation to one another. The inner section of the housing bears the conical regulating core, so that this conical regulating core can be moved in relation to the restrictor in such a way that, due to the conicity of the regulating core, the control gap between the restrictor and the regulating core changes (and with it, the maximum flow of volume of the flow rate regulator). Since the inner moveable section of the housing is tightly encompassed by the outer sections, and since the control element on the inner section of the housing protrudes outwards, the volume flow of the flow rate regulator known in the prior art can be easily changed without having to disassemble this flow rate regulator.

Because the outer sections of the housing that tightly encompass the inner section of the housing are arranged so as to be stationary in relation to each other, a displacement of the inner section of the housing and a displacement of the regulating core, borne by said inner section, and a change in the volume flow, do not automatically result in a change in the overall length of the flow rate regulator, which is disclosed in German patent document DE 20 2004 008 281 U1 of the prior art. Of course, these features do change the maximum flow rate in the flow rate regulator, disclosed in German patent document DE 20 2004 008 U1 of the prior art, but in the case of this flow rate regulator excessive pressure differentials can also have a negative impact on any optional downstream jet regulators or similar functional units.

A flow rate regulator having a multipart control housing is previously known from U.S. Pat. No. 4,867,198. A regulating core around which a fluid circulates and which conically tapers in the direction opposite the fluid flow is mounted in a downstream housing part. This regulating core cooperates with a flow restrictor, made of elastic material, which has the shape of a perforated plate and is affixed in a housing part on the supply flow side. An axial relative motion of the housing parts with respect to one another may be used to determine and specify the extent to which the conical control element projects into the orifice in the flow restrictor having the shape of a perforated plate. When the flow restrictor is deformed as a result of the pressure from the flowing fluid, the flow restrictor is able to move farther in the direction toward the regulating core in such a way that the annular gap remaining between the flow restrictor and the regulating core is further contracted. Since the annular gap may be modified on the one hand by an actuation of the housing parts relative to one another, and on the other hand by the pressure from the flowing fluid, the maximum throughput of the previously known flow rate regulator may be varied as needed and limited to the desired flow rate per unit of time.

SUMMARY OF THE INVENTION

Therefore, one object of the present invention is to provide a flow rate regulator of the type described above that always guarantees a high operating reliability even in the event of low pressure conditions or temporally and/or locally extreme pressure differentials of the fluid flowing through.

This and other objects and advantages are achieved by the flow rate regulator according to the invention, in which the relative position of the restrictor and the regulating profile is variable and moveable against a reset force, into a functional position from a starting position with an unrestricted flow cross section that is larger than the control gap, as a result of the fluid which is flowing in or through.

In the flow rate regulator according to the invention, the relative position of the restrictor and the regulating profile is variable in the axial direction and moveable, against a reset force, from a starting position into a functional position. In the functional position a control gap is delimited between the annular restrictor and the regulating profile. This control gap is variable in its unrestricted flow cross section by the restrictor, which deforms under the pressure differential that is generated when the fluid flows through, so that the maximum flow rate per unit of time is equalized and can be limited, almost pressure-independently, to a fixed value. In contrast, the relative position of the restrictor and the regulating profile is changed in the starting position in such a way that the result is an unrestricted flow cross section that is greater than the control gap. At the same time the relative position of the restrictor and the regulating profile can be moved against a reset force into the functional position from the starting position, as a result of the fluid which is flowing in or through. The reset force can be dimensioned in such a way that when the pressure of the fluid flowing through is low, the restrictor and the regulating profile remain in their starting position. Since in this starting position the unrestricted flow cross section between the restrictor and the regulating profile is larger than the control gap, it is possible at such low pressure conditions for the fluid to pass almost unimpeded through the inventive flow rate regulator, until the pressure increases and the regulating function of the inventive flow rate regulator starts.

Even in areas where there is no concern about such low pressure conditions of the fluid, the flow rate regulator of the invention can be used advantageously, because the unrestricted flow cross section, which is larger in the starting position, allows the dirt particles, entrained in the fluid, to pass with ease through the gap region between the restrictor and the regulating profile. These dirt particles can no longer have an adverse effect on the regulating function of the flow rate regulator of the invention. Therefore, the flow rate regulator of the invention is characterized by a high operating reliability over all of the pressure ranges.

In order to be able to change the relative function of the restrictor and the regulating profile, it is advantageous for the restrictor and/or the regulating profile in the flow rate regulator to be arranged moveably in the axial direction. For example, the restrictor can float on the fluid flowing through in such a way that the restrictor moves in the direction of the regulating profile. However, in a preferred embodiment of the invention, the regulating profile is provided on a regulating core, which is encompassed by the restrictor in the functional position. The regulating core can be moved in the flow rate regulator and can be moved into the functional position under the pressure of the inflowing fluid.

A reliable operating principle of the flow rate regulator is supported, when a guide pin projects into the flow rate regulator and is encompassed by the regulating core, which can be moved on said guide pin.

In this context a preferred embodiment of the invention provides that the regulating core is constructed in the shape of a ring or disk and/or has a guide opening.

It is also possible that the regulating core has a guide pin, which is oriented in the flow direction and which can be moved in a guide opening that is configured on the inflow side and/or the outflow side.

A preferred embodiment of the invention provides that at least one spring coil is provided as the reset force. This spring coil may be constructed, for example, as a compression spring that moves the regulating core back into the starting position as soon as the pressure of the fluid flowing through decreases.

In this context it is practical for at least one spring coil to encompass the guide pin and to activate with its one face end—preferably on the downstream side—the regulating core.

One embodiment of the invention provides that the downstream side of the regulating core has a receiving sleeve, which receives the face end region of the spring coil that activates the regulating core.

In an additional novel embodiment of the invention, the restrictor is mounted on an expanding mandrel that expands in the flow direction, and can be moved on the expanding mandrel, subject to expansion against its own elasticity, from the starting position into the functional position, under the pressure of the inflowing fluid. In this context the expanding mandrel can bear the regulating profile in a downstream sub-area.

In addition or instead, it can be advantageous for the restrictor in the functional position to be surrounded or encompassed by a circumferential wall bearing the regulating profile. In this further development, the restrictor is moved back from the functional position into the starting position by the elastic energy stored in said restrictor itself. The restrictor absorbs the energy, when it is moved from the starting position into the functional position by the pressure of the inflowing fluid and, in so doing, has to expand radially due to its being pulled onto the expanding mandrel. Thus, in the functional position the restrictor is in a radially expanded state. When the fluid is no longer acting on the restrictor, the restrictor contracts and slides through the inclined outer periphery of the expanding mandrel, expanding in the flow direction, upwards into the starting position.

A preferred embodiment of the invention provides that the flow rate regulator is a component of a sanitary installation unit. In this context it is especially advantageous if the sanitary installation unit has an aerated or non-aerated jet regulator, which is mounted downstream of the flow rate regulator. Since the flow rate regulator of the invention forms hardly any flow resistance at low pressure conditions, there is an adequate amount of fluid even at low pressure conditions, in order to be formed into a homogeneous, non-splashing and optional sparkling water jet in the downstream jet regulator.

At the same time, both the handling and the assembly/disassembly are simplified, when the flow rate regulator and the jet regulator of the sanitary installation unit are connected together in a preferably detachable manner.

A preferred embodiment of the invention provides that the jet regulator has a jet divider, which is constructed preferably as a diffuser. The jet divider can also be constructed, for example, as an orifice plate, which has a plurality of small flow holes that produce the individual jets. However, a jet divider, constructed as a diffuser, can aerate the water jet comparatively well even at low pressure conditions.

A space-saving embodiment, which is characterized by a comparatively low installation height, provides that the guide pin protrudes on the diffuser of the downstream jet regulator or has a guide opening.

One preferred embodiment of the invention provides that the flow rate regulator is constructed as an insert component that can be inserted into a fluid line. Hence, a flow rate regulator that is designed as an insert component can be inserted, as desired, even subsequently into the corresponding fluid line.

In this context it is especially advantageous if the flow rate regulator has on its outer circumference at least one peripheral sealing lip which seals between the flow rate regulator and a regulator receptacle in the fluid line. As a result of this sealing lip, extending on the outer circumference of the flow rate regulator, undesired creeping currents are avoided; and an effective seal of the flow rate regulator is achieved in the area of its installation seat. In addition, the peripheral sealing lip secures the flow rate regulator, which is constructed as an insert component, and makes it easier to compress it in the fluid line.

In order to further enhance the sealing effect and/or the retaining force of the flow rate regulator that is constructed as an insert component, it may be advantageous if its free lip end projects so as to slant outwards and can be resiliently deflected radially inwards.

In order to ensure the easy and faultless guiding of the moveable components of the flow rate regulator of the invention, it may be advantageous if the restrictor and/or the regulating profile is/are mounted so as to be axially moveable in a guide cage. In this case the moveable components of the flow rate regulator of the invention are held securely against loss in the flow rate regulator, when the guide cage defines the axial adjusting movements of the restrictor and/or the regulating profile.

Other objects, advantages and novel features of the present invention will become apparent from the following detailed description of the invention when considered in conjunction with the accompanying drawings.

BRIEF DESCRIPTION OF THE DRAWINGS

Additional features of the invention are disclosed in the following description of the inventive embodiments in conjunction with the claims and the drawings. The individual features may be implemented individually or in combination for an embodiment of the invention.

FIGS. 1 and 2 show, respectively, a longitudinal section and a top view of the inflow side of a flow rate regulator constructed as a flip flop regulator, in its starting position, in which a central regulating core is pushed away from an annular restrictor, which encompasses the regulating core and which is made of an elastic material;

FIGS. 3 and 4 show the flow rate regulator of FIGS. 1 and 2 in its functional position, in which the central regulating core is delimited between itself and the restrictor, encompassing the regulating core like a ring;

DETAILED DESCRIPTION OF THE INVENTION

Figure 5:
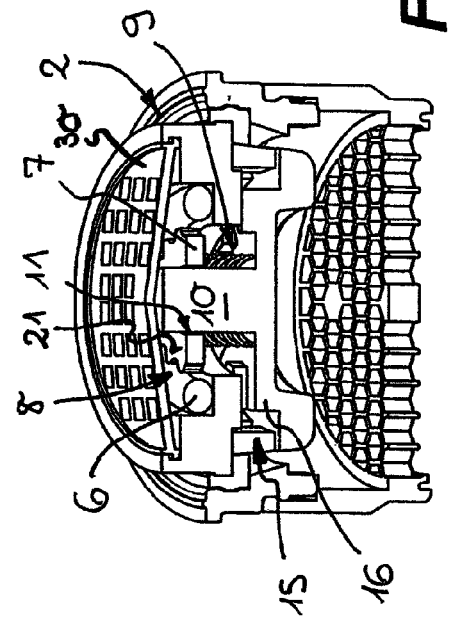
FIGS. 5 and 6 show a starting or resting position of a flow rate regulator which forms with its downstream jet regulator a sanitary installation unit, with an axial guide pin, on which the regulating core of the flow rate regulator is guided moveably, protruding from the jet regulator.
Figure 7:
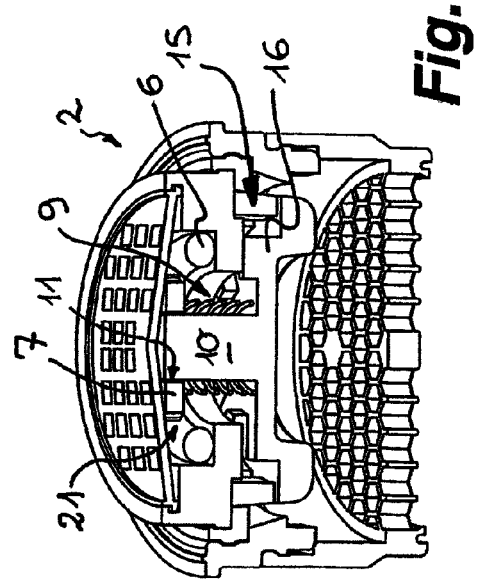
FIGS. 7 and 8 show the flow rate regulator from FIGS. 4 and 6 in its functional position.
Figure 6:
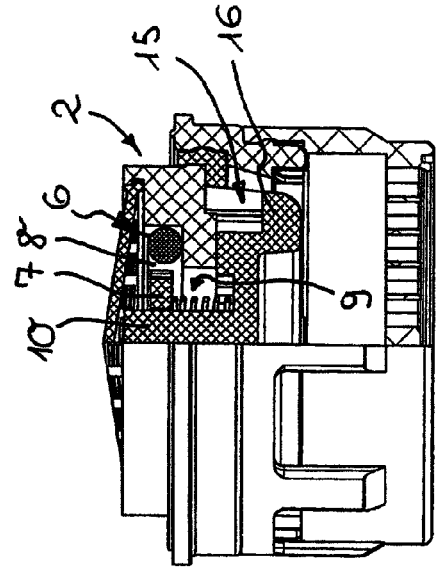
Figure 8:
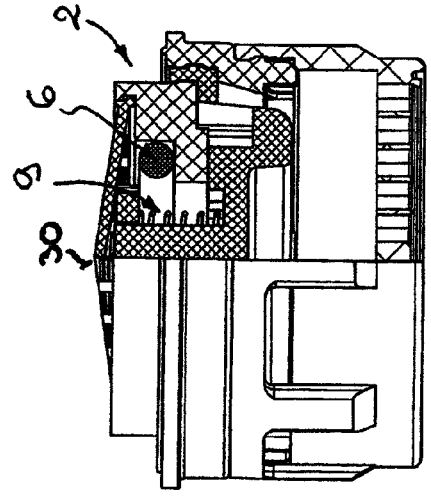
Figure 9:
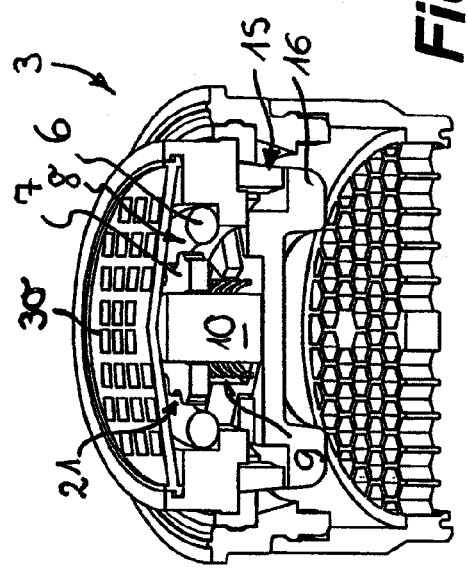
FIGS. 9 and 10 show a sanitary installation unit having a jet regulator and a flow rate regulator, which are shown in a starting position, and are separated functionally, but connected together in a detachable manner.
Figure 10:
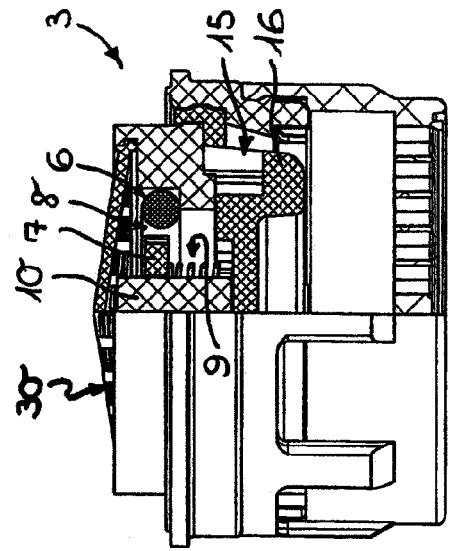
Figure 11:
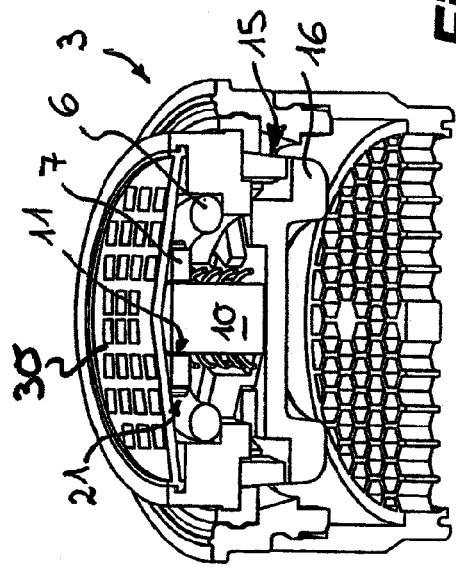
FIGS. 11 and 12 show the flow rate regulator from FIGS. 9 and 10 in the functional position.
Figure 12:
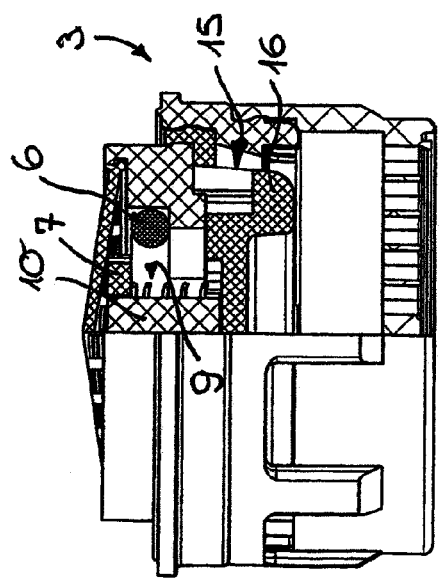
Figure 13:
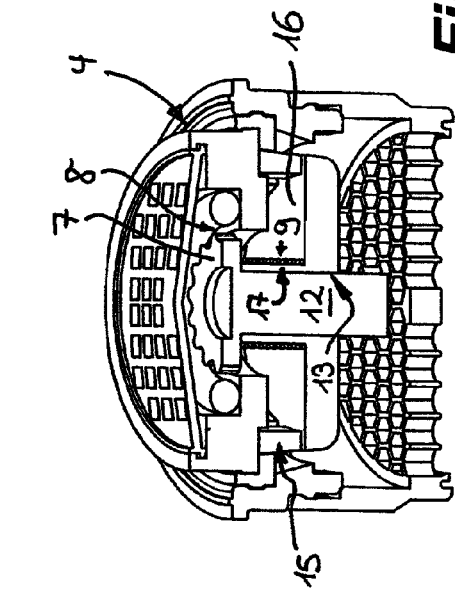
FIGS. 13 and 14 show a flow rate regulator in its starting position, with it regulating core guided moveably with the aid of a guide pin that is constructed as one piece on the regulating core and penetrates a guide opening in a downstream mounted jet regulator.
Figure 14:
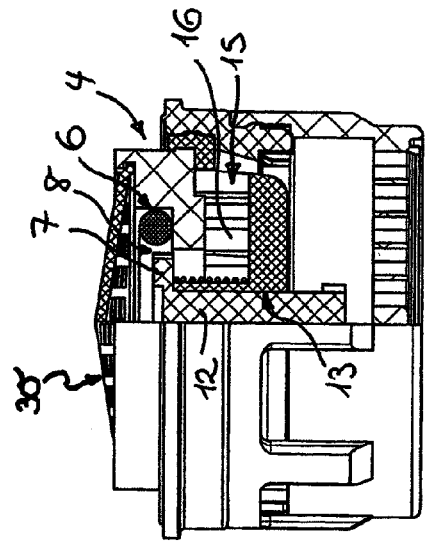
Figure 15:
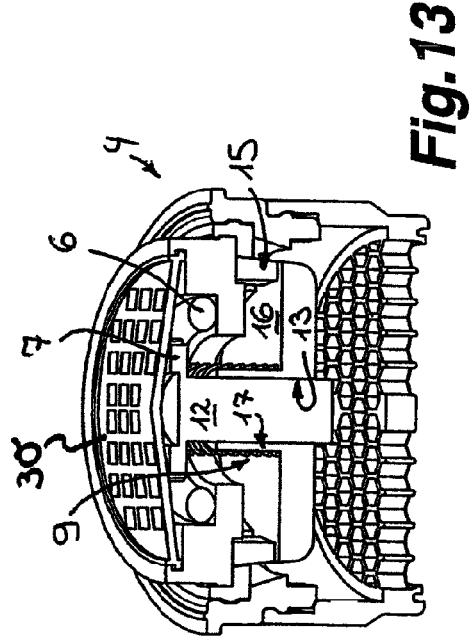
FIGS. 15 and 16 show the flow rate regulator from FIGS. 13 and 14 in the functional position.
Figure 16:
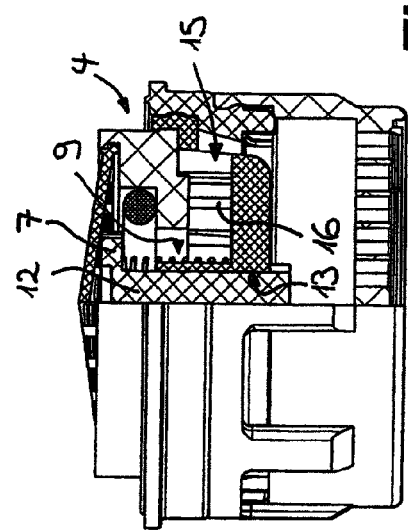
Figure 17:
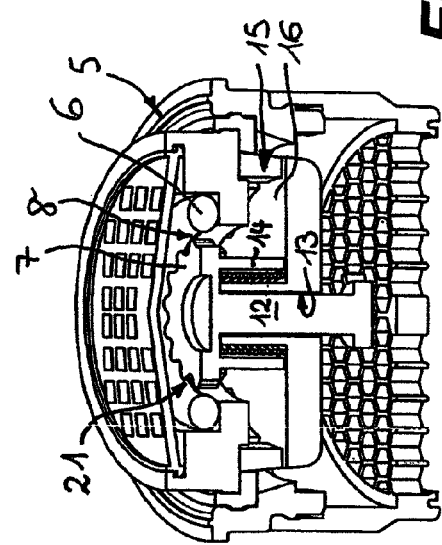
FIGS. 17 and 18 show a flow rate regulator comparable to FIGS. 13 to 16, in its starting position, with a receiving sleeve which is constructed as one piece on the regulating core coaxially to the guide pin and receives the face end region of a compression spring, the latter serving as the reset force, and said face end region driving the regulating core on the downstream side.
Figure 18:
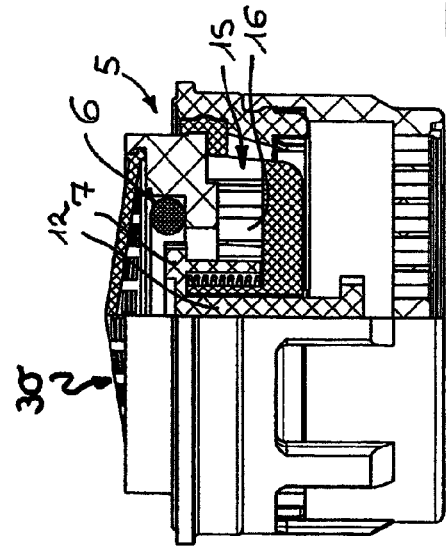
Figure 19:
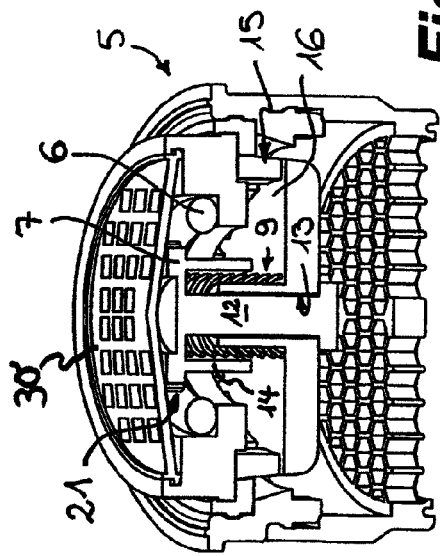
FIGS. 19 and 20 show the flow rate regulator from FIGS. 17 and 18 in the functional position.
Figure 20:
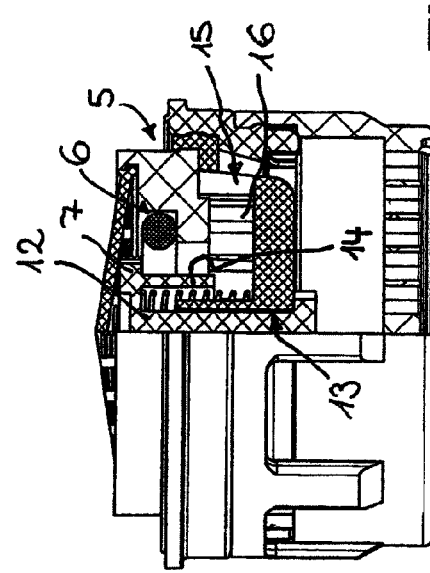
Figure 21:
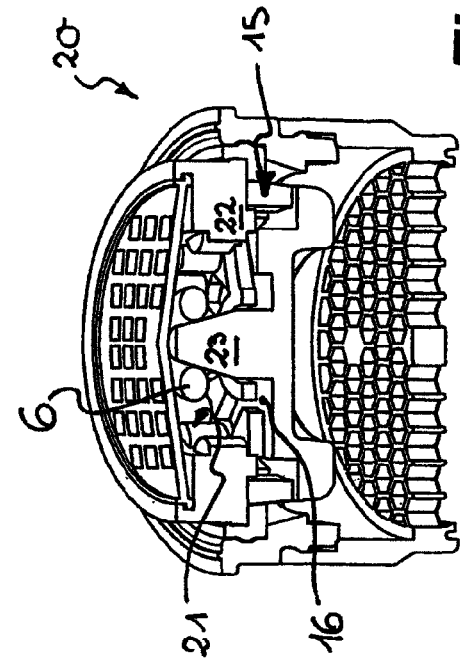
FIGS. 21 and 22 show a flow rate regulator in its functional position, with its elastic restrictor being mounted on an expanding mandrel, which expands conically in the flow direction, and being movable under expansion against its elasticity from the starting position into the functional position on the expanding mandrel (in which it is surrounded or encompassed by a peripheral wall, which bears the regulating profile), by means of the pressure of the inflowing fluid.
Figure 22:
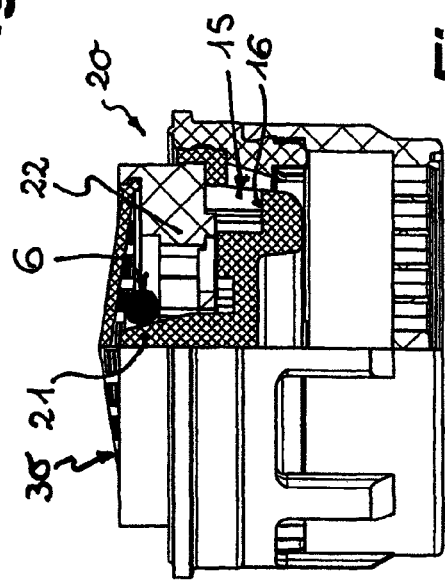
Figure 23:
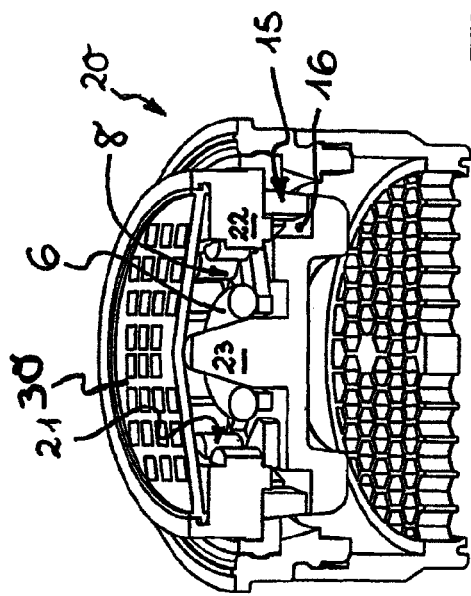
FIGS. 23 and 24 show the flow rate regulator of FIGS. 21 and 22 in its starting position, in which the restrictor on the expanding mandrel is pushed away from the peripheral wall bearing the regulating profile and has contracted in such a way as to accommodate an unrestricted flow cross section that is larger than the control gap.
Figure 24:
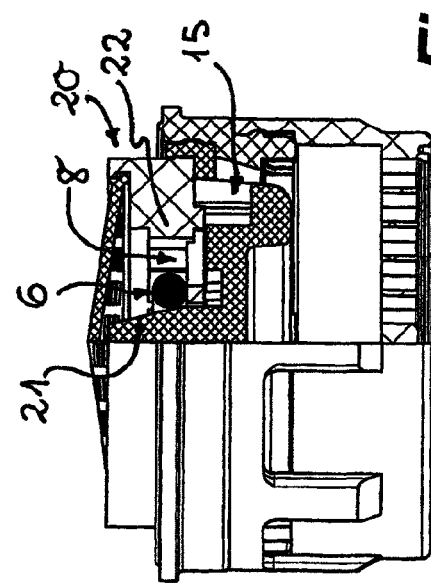

FIGS. 1 to 24 and 28 to 31 depict a flow rate regulator in embodiments designated by reference numerals 1, 2, 3, 4, 5, 20 and 40, which are designed to equalize the maximum flow rate of a fluid per unit of time that flows through a line or preferably flows out of a line, and to set it to a predetermined value. The flow rate regulators 1, 2, 3, 4, 5, 20 and 40 depicted here are components of a sanitary installation unit, which can be inserted, for example, into an outlet orifice (not depicted here in detail) and which can be mounted in this way on the water spout of a plumbing outlet fixture.

The flow rate regulators 1, 2, 3, 4, 5, 20 and 40 include an annular restrictor 6, which is made of an elastic material and which, in the functional position shown in the FIGS. 3, 4; 7, 8; 11, 12; 15, 16; 19, 20; 21, 22 and 30, 31, delimits a control gap 8 between itself and an internally and/or externally disposed regulating profile 21. The control gap 8 is variable in its unrestricted flow cross section by the restrictor 6, which deforms under the pressure differential that is generated when the fluid flows through, and molds itself increasingly into the regulating profile 21 as the pressure rises. A comparison of the FIGS. 1 to 20 as well as 28 to 31, on the one hand, and the FIGS. 21 to 24, on the other hand, shows that the regulating profile 21 can be disposed internally and/or externally in relation to the restrictor 6. Thus, in the case of the flow rate regulators 1, 2, 3, 4, 5, and 40, according to FIGS. 1 to 20 and 28 to 31, the regulating profile 21 is mounted on the outer periphery of a regulating core 7, encompassed by the restrictor 6, while the regulating profile 21 in the flow rate regulator 20, shown in FIGS. 21 to 24, is provided on the internal periphery of a wall 22, surrounding or enveloping the restrictor.

The FIGS. 1 to 20 and 28 to 31 show that the restrictor 6 and the encompassed regulating core 7 are movable relative to each other, between a starting position (shown in the FIGS. 1, 2; 5, 6; 9, 10; 13, 14; 17, 18 and 28, 29) and a functional position (shown in the FIGS. 3, 4; 7, 8; 11, 12; 15, 16; 19, 20 and 30, 31). Whereas, in the functional position the restrictor 6 delimits a control gap 8 between itself and the regulating core 7, the relative position of the restrictor 6 and the regulating core 7 in the starting position is variable in such a manner as to provide an unrestricted flow cross section that is larger than the control gap 8. In this case, as a result of the fluid which is flowing in or through, the relative position of the restrictor 6 and the regulating core 7 can be moved against a reset force, from a starting position into the functional position. The reset force can be dimensioned such that, when the pressure of the inflowing fluid is low, the restrictor 6 and the regulating core 7 remain in their starting position. Since in this starting position the unrestricted flow cross section between the restrictor 6 and the regulating core 7 is larger than the control gap 8, it is possible at low pressure conditions for the fluid to pass almost unimpeded through the flow rate regulator 1, 2, 3, 4, 5 and 40, until the pressure increases and the regulating function of the flow rate regulator 1, 2, 3, 4, 5, and 40 starts.

In order to change the relative function of the restrictor 6 and the regulating core 7, the regulating core 7 is guided here moveably in the flow rate regulator 1, 2, 3, 4, 5 and 40, and can be moved into the functional position under the pressure of the inflowing fluid. At the same time the regulating core 7 is driven on the downstream side by a spring coil 9, which is designed here as a compression spring and which serves as the reset force.

The designs 1, 2, 3, 4, 5, or 40 of the flow rate regulator, depicted here, agree in their key functions and features. They differ only in how the regulating core 7 is guided in the flow rate regulator. In the designs 1, 2, 3, and 40, depicted in the FIGS. 1 to 12 and 28 to 31, a guide pin 10, which protrudes into the flow rate regulator is encompassed by the regulating core 7, which can be moved on the flow rate regulator. This regulating core 7 is constructed here in the shape of a ring or disk and/or has a central guide opening 11, which is penetrated by the guide pin 10.

In the designs 4 and 5, depicted in the FIGS. 13 to 20, the regulating core 7 has a guide pin 12, which is oriented in the flow direction and which can be moved in a downstream guide opening 13.

As is apparent from FIGS. 1 to 20 and 28 to 31 the spring coil 9, serving as the reset force, surrounds the guide pin 10 or 12 and bears with its one face end against the downstream side the regulating core 7. In this context the regulating core 7 of the flow rate regulator 5, shown in FIGS. 17 to 20, has on the downstream side a receiving sleeve 14, which receives in itself the end region of the spring coil 9 that activates the regulating core 7. The axial elongation of this receiving sleeve 14 is dimensioned in such a way that the downstream facing end region of the receiving sleeve 14 serves as a stop for the regulating core 7 in its functional position.

In the flow rate regulator 20, shown in FIGS. 21 to 24, the restrictor 6 is mounted on a tapered mandrel 23 that expands conically in the flow direction of the fluid and protrudes beyond the impact face of a diffuser 16, into the flow rate regulator. On this expanding mandrel 23 the restrictor 6 can be moved (subject to expansion against its own elasticity of its elastic material) from the starting position, shown in FIGS. 23 and 24, into the functional position, shown in FIGS. 21 and 22, under the pressure of the inflowing fluid. In the functional position the restrictor 6 of the flow rate regulator 20 acts together with the external regulating profile 21, which is provided on the inner circumference of a wall 22, surrounding the restrictor.

In the flow rate regulator 20, shown in FIGS. 21 to 24, the annular restrictor 6 is not moved back from its functional position into the starting position by a spring coil, but rather by the elastic energy stored in the restrictor itself. The restrictor absorbs energy, when it is moved from the starting position into the functional position by the available pressure of the fluid and, in so doing, has to expand radially because it is pulled onto the conical expanding mandrel 23. Thus, in its functional position the restrictor 6 is in a radially expanded state. When no more fluid is available and pressure is no longer acting on the restrictor 6, it contracts and slides back through the inclined outer periphery of the conical expanding mandrel 23, upwards into its starting position. In this embodiment the restrictor 6 in the unexpanded state exhibits an outer circumference, which is reduced compared to the functional position, so that the result is an unrestricted flow cross section that is larger than the control gap 8.

In order to suppress the risk that dirt particles entrained in the water will degrade the regulating function of the flow rate regulator and its downstream sanitary operating units, there is a prefilter screen 30 mounted upstream of the flow rate regulators 2, 3, 4, 5 and 20, according to FIGS. 5 to 24. The prefilter screen locks in an inflow sided screen holder of the volume regulators 2, 3, 4, 5, 20 or is held in a preferably detachable manner in the same. In order to counteract any additional high resistance especially at low pressure conditions, the screen openings of the prefilter screen 30 should offer a suitably large unrestricted flow cross section and have a correspondingly large diameter. The risk that correspondingly large dirt particles would be able to pass through the prefilter screen 30 when the screen openings exhibit a sufficiently large diameter, is counteracted advantageously in that the unrestricted flow cross section (which is larger in the starting position) allows the dirt particles that are entrained in the fluid to pass with ease through the gap region between the restrictor 6 and the regulating core 7; and hence, they can no longer have an adverse effect on the regulating function of the flow rate regulator.

Due to their virtually self-cleaning operating principle in the starting position, the flow rate regulators 1, 2, 3, 4, 5, 20 or 40 (illustrated here) can be installed even in areas where there is usually no anxiety about such low pressure conditions of the fluid, but dirt particles, entrained in the water, cannot be ruled out. As the embodiments 2, 3, 4, 5 and 20, which are depicted in FIGS. 5 to 24, show, an aerated or also non-aerated jet regulator 15 can be mounted downstream of the flow rate regulator. In this case the flow rate regulator, on the one hand, and the jet regulator 15, on the other hand, are connected together preferably in a detachable manner to a sanitary installation unit.

The jet regulators 15, shown in FIGS. 5 to 24, include an upstream jet divider, which divides the inflowing water current into a plurality of individual jets. This jet divider is constructed here as a diffuser 16, which facilitates the aeration of the individual jets even at low pressure conditions. However, it is also possible to provide, instead of the diffuser 16, an orifice plate (not illustrated in detail here) as the jet divider.

Whereas in the embodiment 2, depicted in the FIGS. 5 to 8, a guide pin 10 (on which the regulating core 7 of the upstream flow rate regulator 2 can be moved) protrudes on the diffuser 16 of the downstream jet regulator, the diffuser 16 of the design shown in FIGS. 13 to 16, has a guide opening 13, through which the guide pin 12 (protruding on the regulating core 7) extends in a moveable manner. As can be seen in FIGS. 13 to 16, upstream of the guide opening 13 is a guide sleeve 17, whose upstream end serves as a stop for the regulating core 7 in its functional position.

Whereas in the flow rate regulator 2, depicted in FIGS. 5 to 8, the guide pin 10 is formed as one piece with the inflow plate of the diffuser 16, in the flow rate regulator 3 of FIGS. 9 to 12, which is constructed as an insert component, the guide pin 10 is connected as one piece to the regulator housing. It is clear from a comparison of these figures that the flow rate regulator 3, which is shown in FIGS. 9 to 12 and which is constructed as a separate operating unit, can also be used in connection with commercially available jet regulators. In this case the flow rate regulator 3 is installed into the space upstream of the inflow plate of the diffuser 16 and can be connected, as desired, to an upstream prefilter screen 30. The use of the flow rate regulator 3 in connection with commercially available jet regulators is possible because the guide pin 10, oriented in the axial direction, is connected to the regulator housing of the flow rate regulator 3 and not to the diffuser 16 of the jet regulator, mounted downstream in the flow direction.

Figure 25:
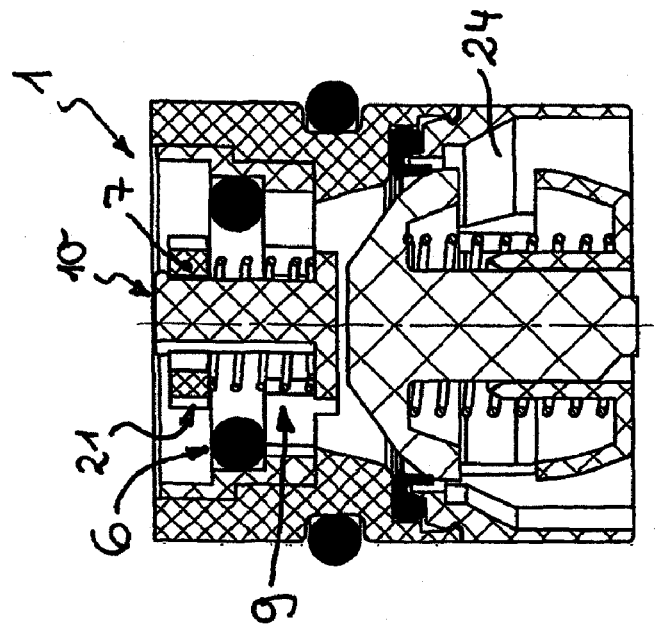
FIG. 25 shows a flow rate regulator, which is comparable to FIGS. 1 to 4, and which, together with a downstream non-return valve, forms an installation unit, with the flow rate regulator and the non-return valve shown in their unloaded starting position.
Figure 26:
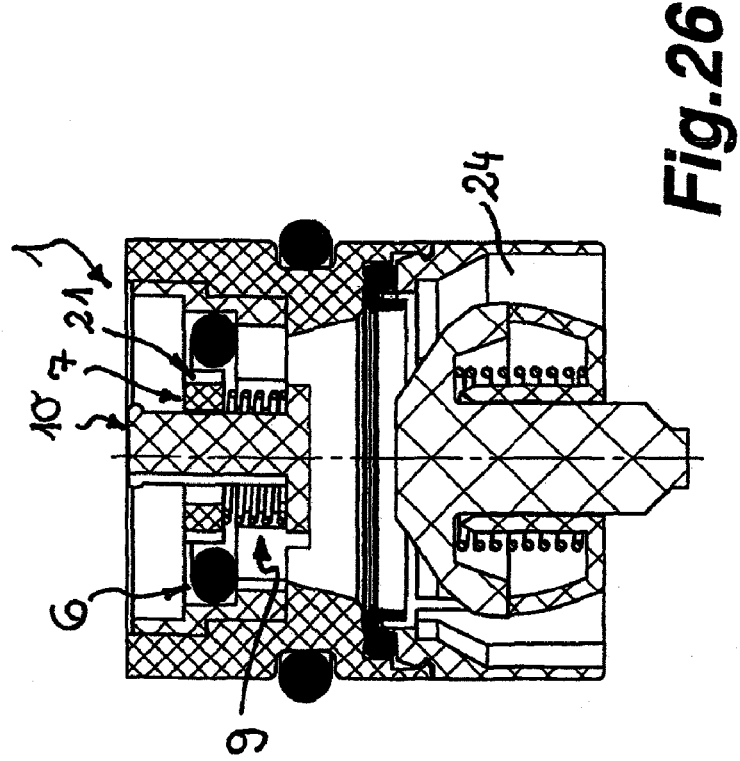
FIG. 26 shows the installation unit from FIG. 25 in the functional position of the flow rate regulator and the non-return valve, so that the fluid flows through the flow rate regulator and the non-return valve.

The flow rate regulators 1, 2, 3, 4, 5, 20 and 40, which are depicted here, can also be used in an advantageous manner in connection with additional sanitary operating units. Thus, the FIGS. 25 and 26 show a flow rate regulator 1, which is comparable to FIGS. 1 to 4, downstream of which is a backflow preventer 24, in the form of a non-return valve. In this context FIG. 25 shows the sanitary insert unit, consisting of the flow rate regulator 1 and the backflow preventer 24, in the starting position, in which the fluid does not exert a load and in which the flow rate regulator 1 exhibits an unrestricted flow cross section that is larger than the control gap 8, and in which the backflow preventer 24 is situated in its closing position. In contrast, FIG. 26 shows this sanitary insert unit in its functional position, in which the restrictor 6 delimits the control gap 8 between itself and the regulating profile 21, and in which the backflow preventer 24 is situated in its opening position. Since, for example, in the case of spray wands on the inflow side of the insert unit it may occur that on the outflow side the pressure is higher than on the inflow side, in the case of the flow rate regulator 1 the backflow preventer 24 is mounted downstream and prevents a backflow of the fluid against the normal flow direction.

With the aid of the flow rate regulators 1, 2, 3, 4, 5, 20 and 40, which are depicted here, the maximum flow rate of the fluid flowing through per unit of time can be equalized and set to a specific value. Since in their starting position or quiescent position the flow rate regulators 1, 2, 3, 4, 5, 20 and 40, which are depicted here, offer the inflowing water or the like fluid only a comparatively small resistance, the flow rate regulators can also be installed in areas, in which temporally and/or locally extreme pressure differentials and pressure fluctuations prevail. Even in such areas, which are characterized by a constant high water pressure, the flow rate regulators, depicted here can be installed advantageously, because in their starting position the dirt particles, entrained in the fluid, pass with ease through the gap region and can no longer exert an adverse effect on the function of the flow rate regulator.

Figure 27:
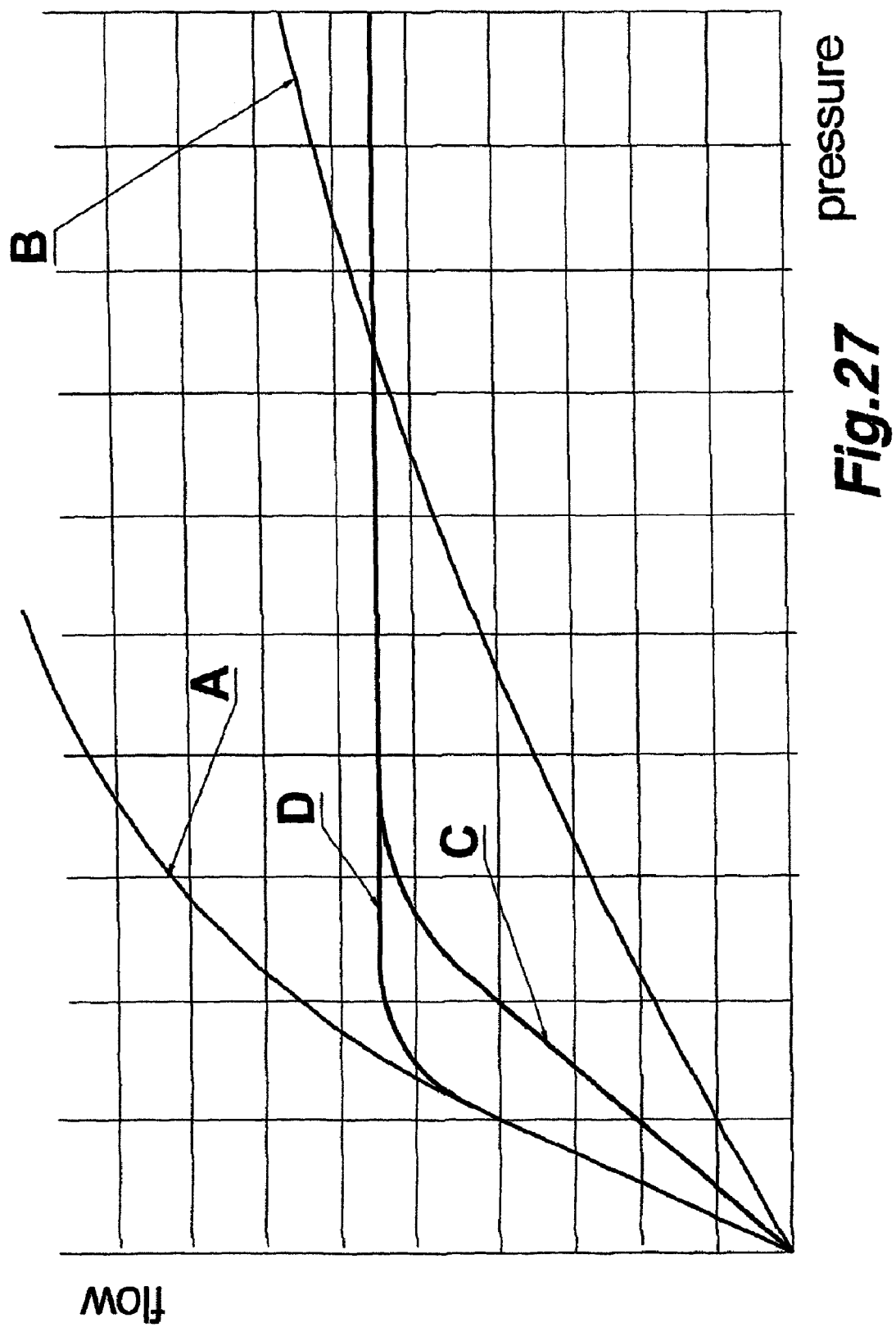
FIG. 27 is a graphic depiction of performance curves that show the flow rate per unit of time of various flow rate regulators, the curve profile A showing the flow rate of an unregulated fluid line, while the curve profile B shows the flow rate of a fluid line, constricted with a standard flow limiter, the curve profile C shows the flow rate of a commercially available flow rate regulator, and the curve profile D shows the flow rate of a flow rate regulator according to the invention.
Figure 28:
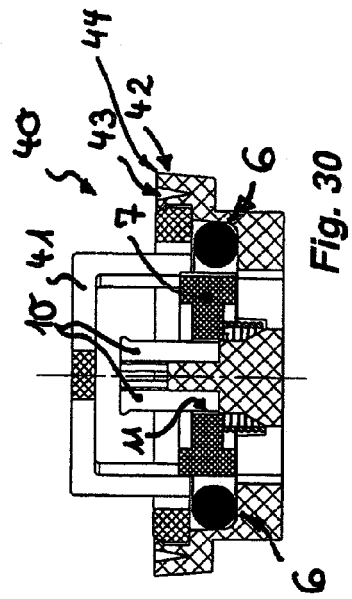
FIGS. 28 and 29 are, respectively, a longitudinal section and a top view of a flow rate regulator comparable to FIGS. 1 to 4, in the starting position of its central regulating core, in which the regulating core is pushed away from an annular restrictor that encompasses the regulating core and is made of an elastic material, such that the regulating core is secured so as to be safe against loss and is guided in a guide cage.
Figure 29:
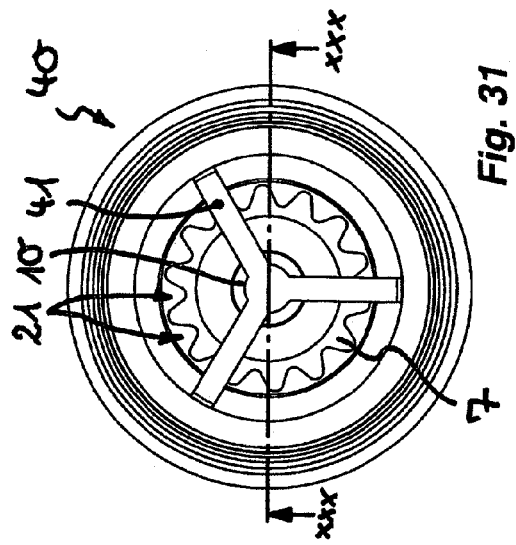
Figure 30:
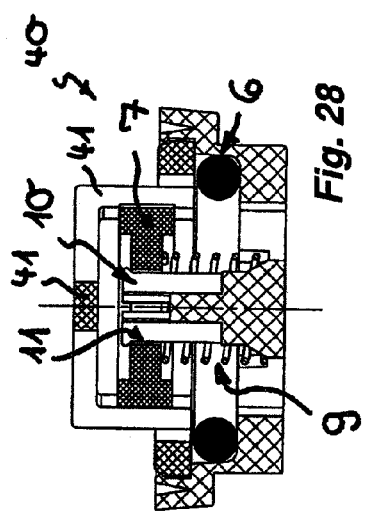
FIGS. 30 and 31 show the flow rate regulator of FIGS. 28 and 29, in its starting position in which the central regulating core defines a gap between itself and the restrictor, encompassing the regulating core like a ring.
Figure 31:
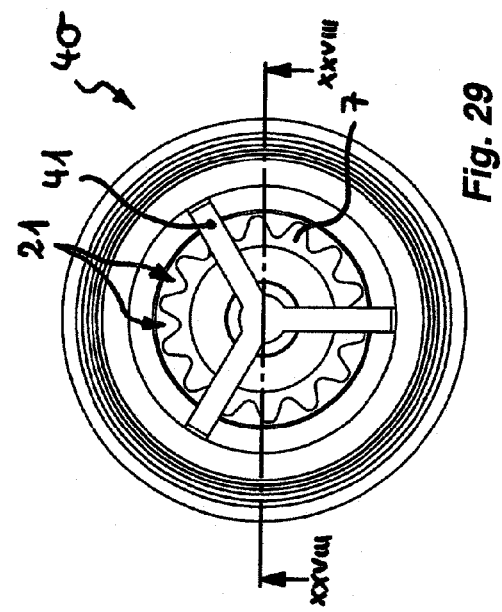

In FIG. 27 the flow rate per unit of time of one of the flow rate regulators 1, 2, 3, 4, 5 and 20, are shown in comparison to various embodiments. The curve profile A shows the flow rate of an unregulated fluid line. In order to be able to maintain, for example, a maximum allowable flow, which is set by the standards, at a given pressure, and in order to reduce the flow rate per unit of time of such a fluid line, a flow limiter, which is constructed, for example, as a simple throttle plate, can be inserted into the fluid line. The curve profile B shows the flow rate of a fluid line, which is restricted by such a flow limiter. The flow rate per unit of time can be adjusted to a specific pressure-independent maximum value by means of a flow rate regulator. The curve profile C shows the flow characteristics of a commercially available flow rate regulator of the prior art and shows very clearly that, when the pressure of the fluid is low, the flow rate is significantly reduced as compared to an unregulated fluid line.

In contrast, the curve profile D shows the flow rate of one of the flow rate regulators 1, 2, 3, 4, 5 or 20, which are disclosed herein. In comparison to the flow rate curves A and C, it shows very clearly that the flow rate regulators 1, 2, 3, 4, 5 or 20 do not have a significant adverse effect on the flow rate per unit of time when the pressure is low, in order to adjust, upon reaching a specific water pressure, to a fixed maximum flow rate per unit of time, which is maintained and not exceeded even if the pressure of the fluid continues to rise.

The flow rate regulators 1, 2, 3, 4, 5, 20 or 40, which are depicted here, can be installed advantageously, for example, even in sanitary supply lines and, in particular, in gas lines and preferably in water lines.

The flow rate regulator 40, which is depicted in FIGS. 28 to 31, has a guide cage 41, which protrudes axially counter to the flow direction and in which the regulating core 7, bearing the regulating profile 21, can be moved axially. This guide cage 41 prevents an undesired floating on the surface and floating away of the regulating core 7 in the event of a backflow of the fluid flowing through. Since the guide cage 41, as evident from FIG. 28, delimits the axial adjusting movement of the regulating core 7, the regulating core 7, which is mounted on the guide pin 10 by very weak locking means, is held in the flow rate regulator 40 and ensures additionally that the flow rate regulator 40 functions properly.

It stands to reason that at least individual components of the flow rate regulators that are depicted here can bear a color code, which indicates to the user the area of application or the regulating characteristics of the flow rate regulator that is marked in this way. Thus, the guide cage 41 of the flow rate regulator 40 may be obtained in the color blue or red—depending on whether this regulator design 40 is intended for the cold or hot water area. Moreover, the color of at least individual components, for example, the guide cage 41, may indicate the spring force of the reset spring 9 that is used and, thus, indicate the regulating characteristics of the flow rate regulator 40, which is marked in this way.

The FIGS. 28 to 31 show clearly that the flow rate regulator 40, which is depicted here, is also constructed as an insert component, which can be installed in a fluid line. In this case the flow rate regulator 40 exhibits on its outer periphery at least one peripheral sealing lip 42, which forms a seal between the flow rate regulator 40 and a regulator receptacle in the fluid line. The sealing lip 42, which is separated from the outer periphery of the regulator housing by means of a groove 43, which is open in the inflow direction and is constructed here somewhat in the shape of a wedge, protrudes with its free lip end 44 obliquely outwards and can be resiliently deflected radially inwards. The sealing lip 42 provided on the flow rate regulator 40 not only makes it possible to achieve a good seal in the area between the flow rate regulator and the surrounding regulator receptacle, but also the sealing lip 42 in fact supports the permanent hold of the flow rate regulator 40 in this regulator receptacle (not shown).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A flow rate regulator comprising:
a centrally or peripherally disposed element with a radial regulating profile having raised and lowered portions in a radial direction; and
an annular restrictor which is made of an elastic material; wherein,
in a functional position of said flow rate regulator, said restrictor delimits a control gap between itself and said regulating profile and the raised and lowered portions of the radial regulating profile face the annular restrictor in the radial direction;
in a starting position, of said flow rate regulator, said flow rate regulator has an internal flow cross section that is larger than the control gap;
an internal flow cross section of the control gap is variable by a deformation of said restrictor under a pressure differential that is generated when a fluid flows through the flow rate regulator;
a relative position of the restrictor and the regulating profile is variable, and moveable against a reset force, into the functional position from the starting position, in response to a flow of fluid within said flow rate regulator,
wherein the restrictor is mounted on a tapered mandrel which has a diameter that increases in a flow direction, and can be moved on said tapered mandrel, subject to expansion against its own elasticity, from the starting position into the functional position, under pressure of the fluid flow.

2. The flow rate regulator, as claimed in claim 1, wherein in the functional position the restrictor is surrounded or encompassed by a wall, bearing the regulating profile.

3. A flow rate regulator comprising:
a centrally or peripherally disposed element with a radial regulating profile having raised and lowered portions in a radial direction; and
an annular restrictor which is made of an elastic material; wherein,
in a functional position of said flow rate regulator, said restrictor delimits a control gap between itself and said regulating profile and the raised and lowered portions of the radial regulating profile face the annular restrictor in the radial direction;
in a starting position, of said flow rate regulator, said flow rate regulator has an internal flow cross section that is larger than the control gap;
an internal flow cross section of the control gap is variable by a deformation of said restrictor under a pressure differential that is generated when a fluid flows through the flow rate regulator;
a relative position of the restrictor and the regulating profile is variable, and moveable against a reset force, into the functional position from the starting position, in response to a flow of fluid within said flow rate regulator,
wherein at least one spring coil provides the reset force.

4. The flow rate regulator, as claimed in claim 3, wherein one of the restrictor and the regulating profile is arranged moveably in an axial direction in the flow rate regulator.

5. The flow rate regulator, as claimed in claim 3, wherein the flow rate regulator is constructed as an insert component that can be inserted into a fluid line.

6. The flow rate regulator, as claimed in claim 3, wherein the at least one spring coil surrounds the guide pin and bears against a face of the regulating core.

7. The flow rate regulator, as claimed in claim 6, wherein a downstream side of the regulating core has a receiving sleeve, which receives an end region of the spring coil that bears against the regulating core.

8. The flow rate regulator, as claimed in claim 3, wherein:
the flow rate regulator has at least one peripheral sealing lip on its outer circumference; and
said sealing lip seals between the flow rate regulator and a regulator receptacle in the fluid line.

9. The flow rate regulator, as claimed in claim 8, wherein the sealing lip with its free lip end projects so as to slant outwards, and is resiliently deflectable radially inwards.

10. The flow rate regulator, as claimed in claim 3, wherein at least one of the restrictor and the regulating profile is mounted so as to be axially moveable in a guide cage.

11. The flow rate regulator, as claimed claim 10, wherein the guide cage defines an axial adjusting movement of the restrictor or the regulating profile.

12. The flow rate regulator, as claimed in claim 3, wherein the flow rate regulator is a component of a sanitary installation unit.

13. The flow rate regulator, as claimed in claim 12, wherein the sanitary installation unit has a jet regulator mounted downstream of the flow rate regulator.

14. The flow rate regulator, as claimed in claim 13, wherein the jet regulator has a jet divider in the form of a diffuser.

15. The flow rate regulator, as claimed in claim 3, wherein the regulating profile is provided on a regulating core, which is surrounded by the restrictor in the functional position, and which can be moved into the functional position of the flow rate regulator, under pressure of an inflowing fluid.

16. The flow rate regulator, as claimed in claim 15, wherein the regulating core is one of ring and disk shaped, and has a guide opening.

17. The flow rate regulator, as claimed in claim 15, wherein the regulating core has a guide pin, which is oriented in the flow direction and which can be moved in a guide opening that is configured on one of an inflow side and an outflow side.

18. The flow rate regulator, as claimed in claim 15, further comprising:
a guide pin, which protrudes into the flow rate regulator, and is surrounded by the regulating core;
wherein the regulating core is moveable on said guide pin.

19. The flow rate regulator, as claimed in claim 18, wherein one of the guide pin and the guide opening is provided on a diffuser of a downstream jet regulator.

\* \* \* \* \*